(12) United States Patent
Tsuchimochi et al.

(10) Patent No.: US 8,742,904 B2
(45) Date of Patent: Jun. 3, 2014

(54) INDUSTRIAL INSTRUMENT AND MACHINE TOOL CONTROL

(75) Inventors: Koji Tsuchimochi, Yamatokoriyama (JP); Takashi Noguchi, Yamatokoriyama (JP)

(73) Assignee: DMG Mori Seiki Co., Ltd., Yamatokoriyama-shi (JP)

( * ) Notice: Subject to any disclaimer, the term of this patent is extended or adjusted under 35 U.S.C. 154(b) by 656 days.

(21) Appl. No.: 12/950,249

(22) Filed: Nov. 19, 2010

(65) Prior Publication Data

US 2011/0156884 A1    Jun. 30, 2011

(30) Foreign Application Priority Data

Dec. 25, 2009    (JP) ................................. 2009-295586

(51) Int. Cl.
| G08C 19/16 | (2006.01) |
| G05B 11/01 | (2006.01) |
| G05D 1/00  | (2006.01) |
| G06F 19/00 | (2011.01) |
| B64C 13/20 | (2006.01) |

(52) U.S. Cl.
USPC ................... 340/12.22; 340/12.1; 340/568.3; 340/538; 340/12.24; 701/2; 701/24; 701/120; 244/189; 244/190

(58) Field of Classification Search
USPC ...................................... 340/12.1, 538, 568.2
See application file for complete search history.

(56) References Cited

U.S. PATENT DOCUMENTS

| 8,255,064 B2 * | 8/2012 | Chen et al. ...................... 700/19 |
| 8,255,092 B2 * | 8/2012 | Phillips et al. ................... 701/2 |
| 2003/0214428 A1 * | 11/2003 | Tokita ............................ 341/176 |
| 2006/0047393 A1 * | 3/2006 | Casey ............................. 701/50 |
| 2008/0018287 A1 * | 1/2008 | Ogawa .......................... 318/652 |
| 2008/0223993 A1 * | 9/2008 | Spirov et al. ................. 244/23 A |
| 2008/0234855 A1 * | 9/2008 | Haas et al. ..................... 700/180 |
| 2009/0153092 A1 * | 6/2009 | Hosokawa et al. ........... 318/591 |

FOREIGN PATENT DOCUMENTS

JP    2007-160449 A    6/2007

* cited by examiner

*Primary Examiner* — Fekadeselassie Girma

(74) *Attorney, Agent, or Firm* — Oblon, Spivak, McClelland, Maier & Neustadt, L.L.P.

(57) ABSTRACT

A control device of a machine tool includes a first determination unit determining an amount of rotation, rotational speed, and direction of rotation of a rotary handle based on a pulse signal generated by rotation of the rotary handle at a manual pulse generator, and a second determination unit determining which of position control and rotational speed control is selected by selection of an axis through an axis selector switch, based on a signal generated by an axis selection signal generator at an operation device including the manual pulse generator. When a determination is made that position control is selected, the control device controls the amount and direction of travel of a spindle based on the amount of rotation and direction of rotation of the rotary handle. When a determination is made that rotational speed control is selected, the control device controls the rotational speed and direction of rotation of a table based on the rotational speed and direction of rotation of the rotary handle. Accordingly, the user can readily set the direction of rotation and rotational speed of the table using the manual pulse generator, and cause the table to move at the set direction of rotation and rotational speed.

3 Claims, 10 Drawing Sheets

| DIRECTION OF ROTATION OF ROTARY HANDLE 421 | DIRECTION OF ROTATION OF TABLE 36 |
|---|---|
| + DIRECTION (CLOCKWISE) | CLOCKWISE (DIRECTION OF ARROW 305 IN FIG. 2) |
| − DIRECTION (COUNTERCLOCKWISE) | COUNTERCLOCKWISE (DIRECTION OF ARROW 306 IN FIG. 2) |

INDUSTRIAL INSTRUMENT AND MACHINE TOOL CONTROL

BACKGROUND OF THE INVENTION

1. Field of the Invention

The present invention relates to industrial instruments and machine tools. Particularly, the present invention relates to an industrial instrument and machine tool including a manual pulse generator.

2. Description of the Background Art

Machine tools including a manual pulse generator are conventionally known. In such a machine tool, a manual pulse generator is employed for position control of an object that is the interest of control such as a movable body.

For example, Japanese Patent Laying-Open No. 2007-160449 discloses a machine tool including a manual pulse generator employed in position control. The operation unit of the manual pulse generator includes a feed rod changing switch for selecting which of the feeding direction in the X axis, Y axis, and Z axis the spindle mechanism (tool) and the work attachment mechanism (work) are to be moved relatively, a magnification switch for switching the amount of travel per pulse, and a rotary handle provided rotatably about an axis perpendicular to the front face of the main body, generating a pulse signal according to the rotation amount by rotating about the axis.

There is also known a conventional machine tool rotating the spindle about the rotation axis of the spindle up to a position according to the number of pulse signals generated based on the rotation of the manual pulse generator, i.e. a machine tool having a position control function based on rotation.

There is also known a conventional machine tool including a rotational speed selector switch, a normal rotation button, and a reverse rotation button on an operation panel. In such a machine tool, the user can cause rotation of a spindle that does not have a position control function based on rotation by means of rotational speed control, using the rotational speed selector switch, the normal rotation button, and the reverse rotation button. Specifically, subsequent to determining the speed through the selector switch, the user depresses the normal rotation button or reverse rotation button to cause the spindle to start rotating. The spindle continues rotation in the direction of the depressed button at the determined speed as long as the user is depressing the normal rotation button or reverse rotation button. When the user takes his/her hand off the normal rotation button or reverse rotation button, the spindle stops its rotation.

SUMMARY OF THE INVENTION

In the case where the user wishes to change the speed and/or direction of the rotating body such as the spindle in a conventional machine tool having a rotational speed selector switch, a normal rotation button, and a reverse rotation button, the user must first take his/her hand off the normal rotation button or reverse rotation button. Then, the user has to select the rotational speed through the rotational speed selector switch. Further, the user must depress again the normal rotation button or reverse rotation button. Such operations are bothersome to the user in the case where a rotating body is to be rotated without a position control function.

A machine tool having a position control function based on rotation cannot have the moving speed (rotational speed) of the rotating body set by the manual pulse generator.

According to an aspect of the present invention, an industrial instrument performs position control of a movable body moving along a first axis, and rotational speed control of a rotating body rotating about a second axis. The industrial instrument includes a manual pulse generator, a selector switch for selecting manually one of a plurality of axes including the first axis and the second axis, and a control device. The manual pulse generator includes a rotary handle rotated by hand, and a first signal generator generating a pulse signal based on rotation of the rotary handle, and transmitting the generated pulse signal to the control device. The selector switch includes a second signal generator generating a signal corresponding to the selected axis. The second signal generator transmits the signal corresponding to the selected axis to the control device. The control device includes a first determination unit determining an amount of rotation, rotational speed, and direction of rotation of the rotary handle based on the pulse signal, and a second determination unit determining which of position control and rotational speed control is selected by the selection of an axis by the selector switch based on the signal generated by the second signal generator. When a determination is made that position control is selected, the control device controls the amount and direction of travel of the movable body based on the amount and direction of rotation of the rotary handle. When a determination is made that rotational speed control is selected, the control device controls the rotational speed and direction of rotation of the rotating body based on the rotational speed and direction of rotation of the rotary handle.

Preferably, the control circuit controls the rotational speed of the rotating body in a stepped manner based on the rotational speed of the rotary handle to increase the rotational speed of the rotating body as the rotational speed of the rotary handle becomes faster.

According to another aspect of the present invention, a machine tool includes a movable body moving along a first axis, and a rotating body rotating about a second axis to perform position control of the movable body and rotational speed control of the rotating body. The machine tool further includes a manual pulse generator, a selector switch for selecting manually one of a plurality of axes including the first axis and the second axis, and a control device. The manual pulse generator includes a rotary handle rotated by hand, and a first signal generator generating a pulse signal based on rotation of the rotary handle, and transmitting the generated pulse signal to the control device. The selector switch includes a second signal generator generating a signal corresponding to the selected axis. The second signal generator transmits the signal corresponding to the selected axis to the control device. The control device includes a first determination unit determining an amount of rotation, rotational speed, and direction of rotation of the rotary handle based on the pulse signal, and a second determination unit determining which of position control and rotational speed control is selected by the selection of an axis by the selector switch based on the signal generated by the second signal generator. When a determination is made that position control is selected, the control device controls the amount and direction of travel of the movable body based on the amount and direction of rotation of the rotary handle. When a determination is made that rotational speed control is selected, the control device controls the rotational speed and direction of rotation of the rotating body based on the rotational speed and direction of rotation of the rotary handle.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
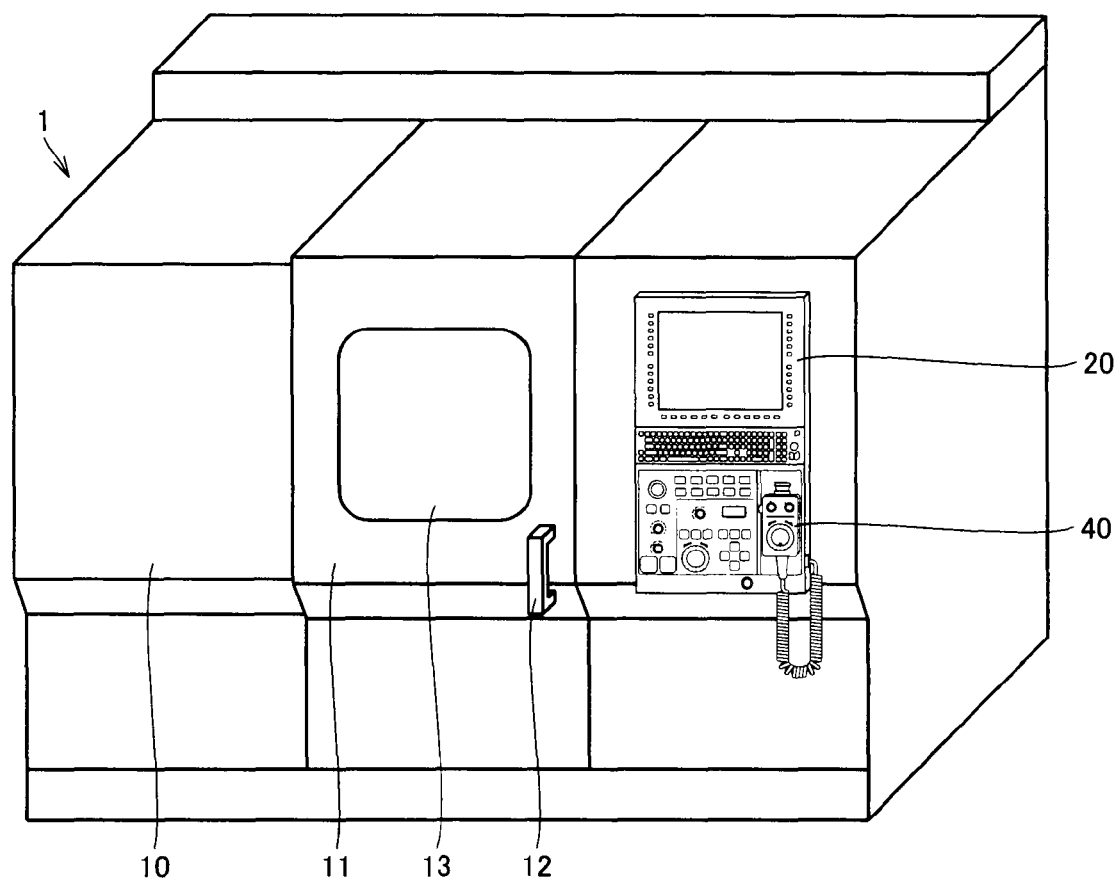
FIG. 1 is a perspective view of a machine tool.

A machine tool that is one type of an industrial instrument according to an embodiment of the present invention will be described hereinafter with reference to the drawings. In the following, the same components have the same reference characters allotted. Their designation and function are also the same. Therefore, detailed description thereof will not be repeated.

<Outline of Machine Tool>

Figure 2:
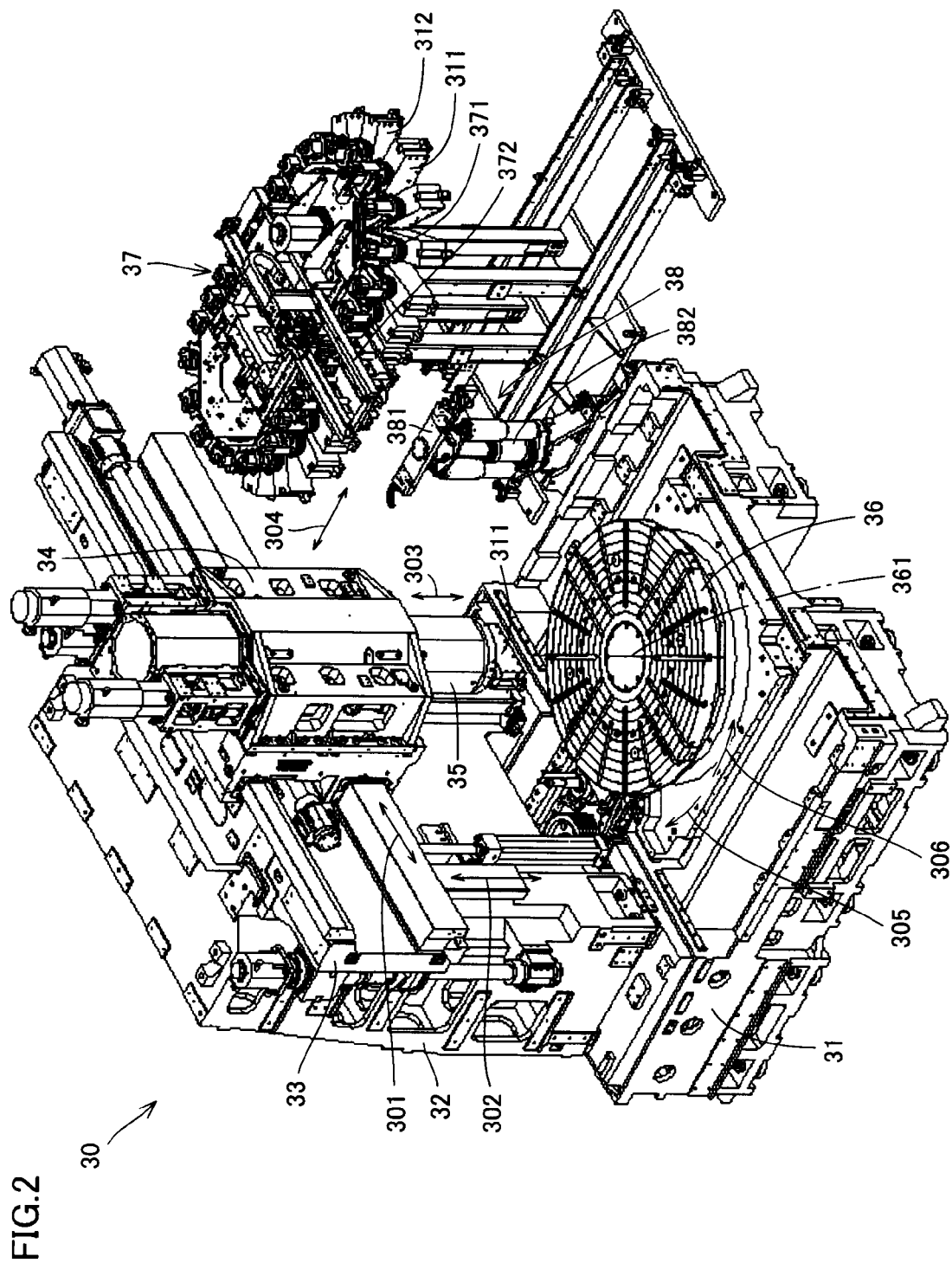
FIG. 2 is a perspective view of a main unit.

Referring to FIG. 1, a machine tool 1 according to the present embodiment includes a splash guard 10, an operation panel 20, an operation device 40, and a main unit 30 (refer to FIG. 2).

Splash guard 10 includes an open/close type door 11. Door 11 includes a handle 12 and a window 13. Splash guard 10 is provided surrounding main unit 30. Splash guard 10 serves to protect the user, prevent the scattering of chips and coolant, and collection thereof in conjunction with the machining process and the like of a work at main unit 30. The user can slide door 11 by holding handle 12. The user can visually confirm the processing of a work by main unit 30 through window 13.

Operation panel 20 accepts various operations from the user. Operation panel 20 controls the operation of main unit 30 according to an operation by the user. Details of operation panel 20 will be described afterwards.

Operation device 40 is a handy movable device connected to operation panel 20 through a cable. Operation device 40 accepts various operations from the user. Likewise with operation panel 20, operation device 40 controls the operation of main unit 30 according to an operation by the user. Details of operation device 40 will be described afterwards.

[Main Unit 30]

Referring to the perspective view of FIG. 2, main unit 30 has a turning function using a fixed tool, and a milling function using a rotary tool. In other words, main unit 30 is a lathe having a milling function. More specifically, main unit 30 is a vertical lathe for cutting a workpiece (work) held at a table by a rotary movement of a table centered about a vertical axis, and a feeding movement of a tool bit that is a fixed tool.

The overall configuration of main unit 30 will be described hereinafter. Main unit 30 includes, as the main component, a bed 31, a column 32, a cross rail 33, a saddle 34, a ram 35, a table 36, a tool magazine 37, and an automatic tool changer 38.

Bed 31 is a base member to support column 32, table 36, and the like. Bed 31 is situated on an installation face such as at a factory. Column 32 is attached to bed 31 in an upright position from the top face of bed 31. Cross rail 33 is attached to column 32 in a slidable manner thereto in the axial direction indicated by arrow 302 (the ZB axis direction).

Saddle 34 is attached to cross rail 33 in a slidable manner thereto in the axial direction indicated by arrow 301 (the X axis direction). Ram 35 is attached to saddle 34 in a slidable manner thereto in the axial direction indicated by arrow 303 (the Z axis direction). Ram 35 is mounted with a spindle (not shown).

A feeding mechanism and/or guiding mechanism, a servo motor, and the like are provided appropriately with respect to column 32, cross rail 33, saddle 34 and ram 35 to allow the slidable movement of each component.

The ZB axis that is the axis of travel of cross rail 33 and the Z axis that is the axis of travel of ram 35 are parallel to each other and extend in the vertical direction. The X axis that is the axis of travel of saddle 34 is orthogonal to the ZB axis and the Z axis, and extends horizontally. By a combination of the sliding movements of each of cross rail 33, saddle 34 and ram 35 in main unit 30 of the present embodiment, the site of machining the work by the tool loaded to tool holder 311, 312 is shifted arbitrarily on the X-Z plane.

Main unit 30 is not limited to the above-described construction, and may be configured having a structure slidable in the direction of the Y axis (direction of arrow 304) orthogonal to the X axis and Z axis. In other words, there is a main unit having a configuration in which the spindle moves in the Y axis direction, although not shown. In this case, the site of machining the work by a tool loaded to the tool holder is shifted three-dimensionally. Moreover, since ram 35 is attached to saddle 34, a travel of saddle 34 in the X axis direction and/or Y axis direction causes ram 35 to move by just the same distance in the same direction.

Table 36 is provided rotatable by a motor drive, about a central axis 361 extending vertically. A work is held on table 36 by means of a chuck and/or various types of jigs. During a turning process using a fixed tool, the work rotates about central axis 361 clockwise (the direction of arrow 305) and counterclockwise (direction of arrow 306), together with the rotation of table 36. A turning process is conducted by moving the fixed tool close to the rotating work. During a milling process using a rotary tool, table 36 is basically stationary. A milling process is conducted by moving the rotary tool close to the work secured on table 36.

Tool magazine 37 is capable of accommodating a plurality of tool holders 311, 312 used in a turning process or milling process. The plurality of tool holders 311, 312 are stored in tool magazine 37 in a state held by a plurality of tool pots 371 provided at equal interval to an endless chain. A predetermined tool pot 371 is shifted to the site of a shifter 372 by the circulation of the endless chain through a motor drive.

Automatic tool changer 38 functions to automatically exchange tool holders 311, 312 attached to the spindle for other tool holders 311, 312 prepared at tool magazine 37. Automatic tool changer 38 includes a double arm 381 and a drive device 382.

In the following, main unit 30 will be described as configured with a construction capable of sliding in the Y axis direction orthogonal to the X axis and the Z axis.

[Operation Panel 20 and Operation Device 40]

Figure 3:
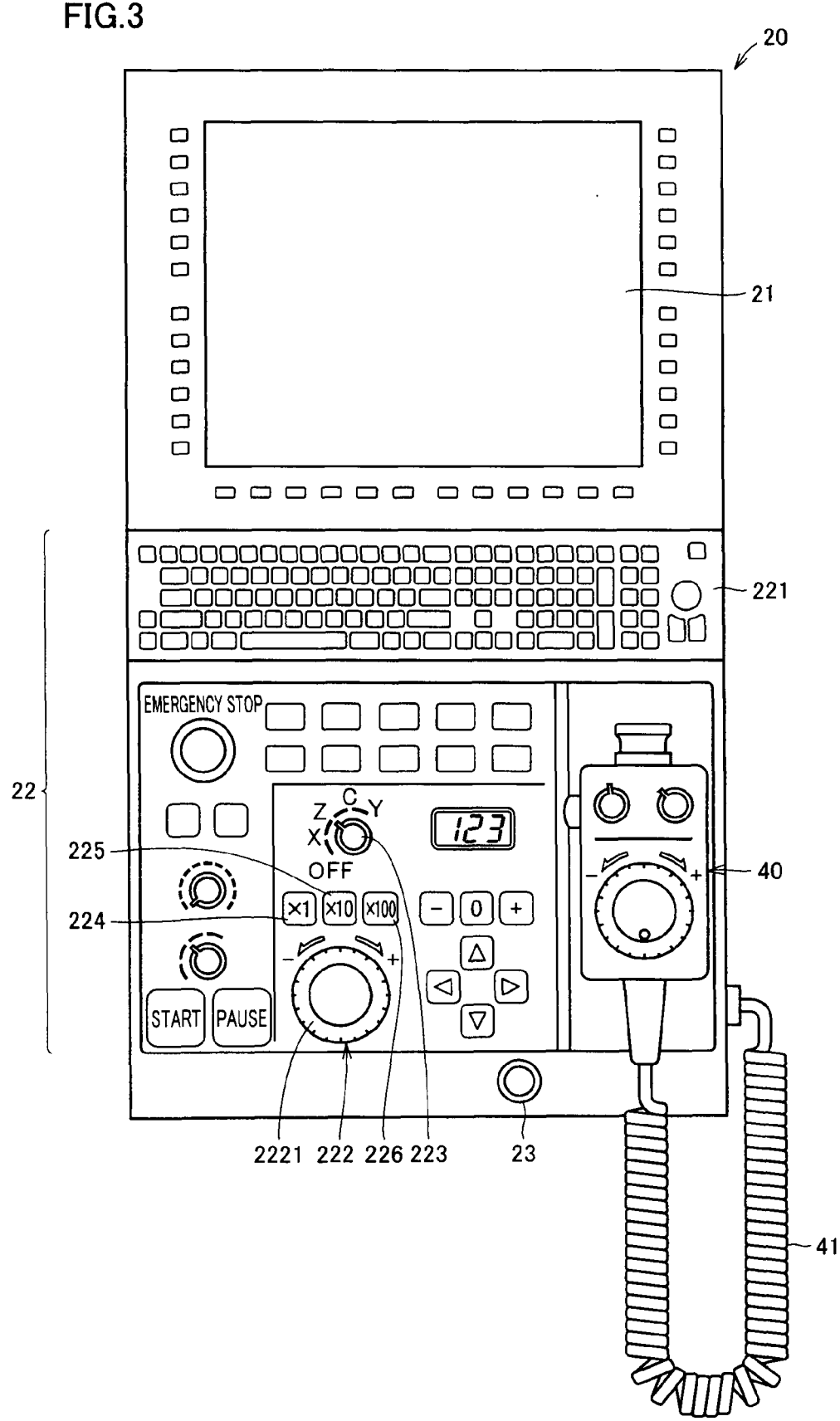
FIG. 3 represents an operation panel and an operation device.

FIG. 3 represents an operation panel 20 and an operation device 40. Referring to FIG. 3, operation panel 20 includes a monitor 21, an operation unit 22, and an interface 23.

Operation unit 22 includes at least a keyboard 221, a manual pulse generator 222, an axis selector switch 223, and magnification switches 224, 225 and 226. Manual pulse generator 222 includes a rotary handle 2221 rotated by hand.

Figure 7:
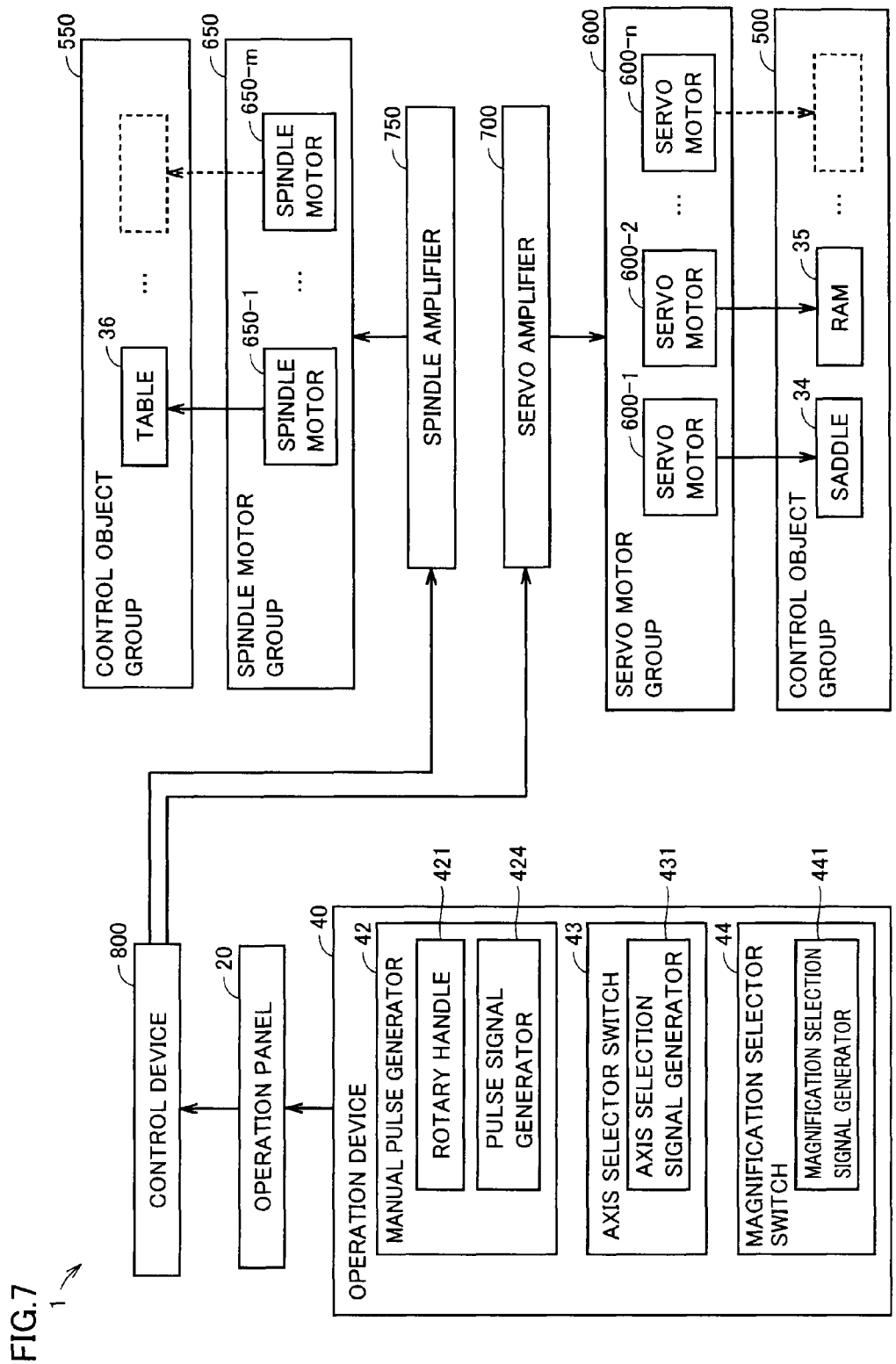
FIG. 7 represents a hardware configuration of the machine tool.

Keyboard 221 is an input device for the user to enter various data to control device 800 (refer to FIG. 7). Manual pulse generator 222, axis selector switch 223, and magnification switches 224, 225 and 226 will be described afterwards.

Operation device 40 includes a cable 41. Operation device 40 is connected by cable 41 to allow communication with operation panel 20.

Figure 4:
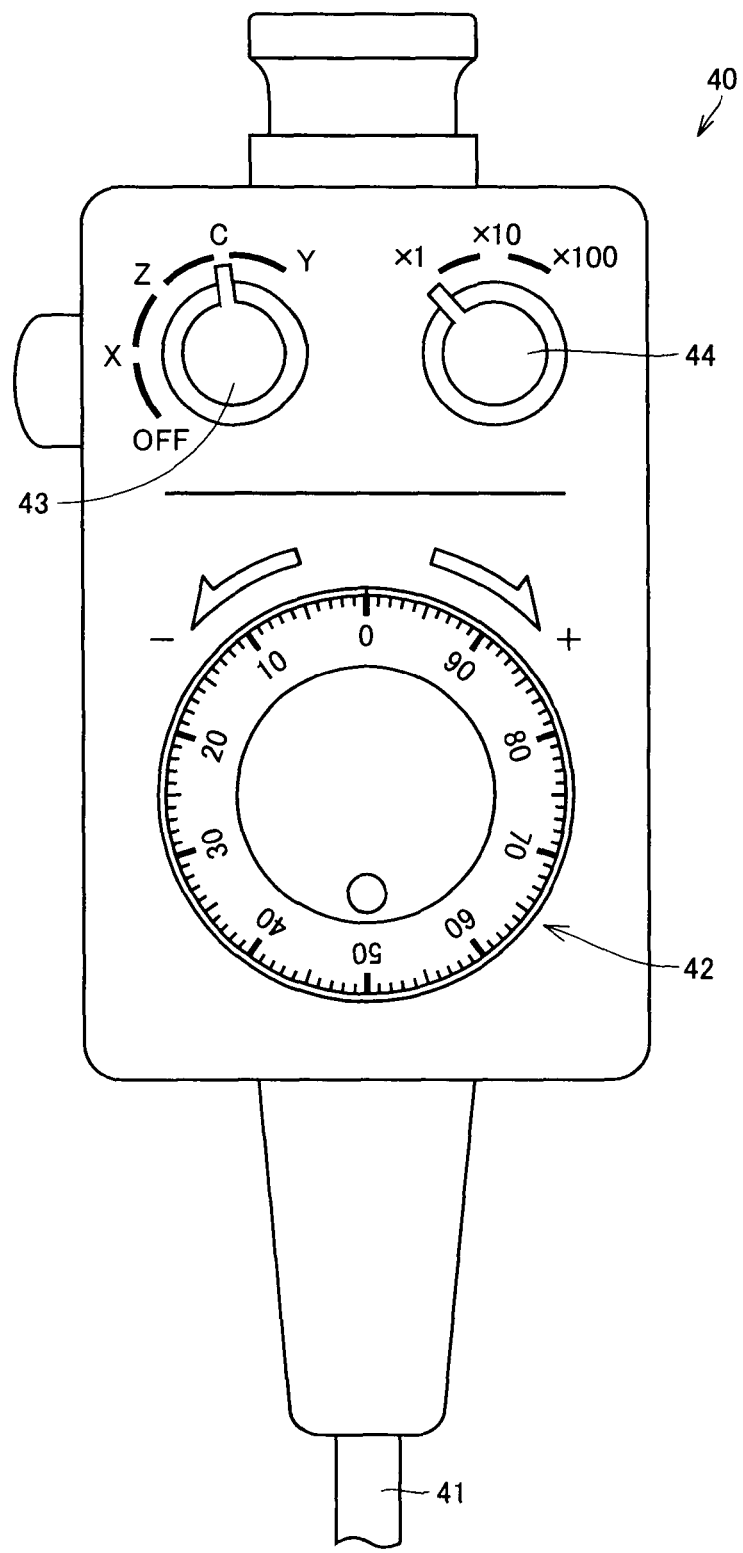
FIG. 4 represents an operation device.

Referring to FIG. 4, operation device 40 includes cable 41, manual pulse generator 42, axis selector switch 43, and magnification selector switch 44.

Figure 5:
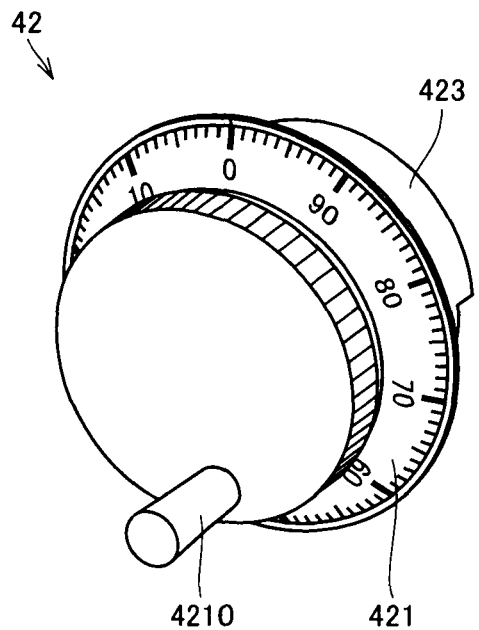
FIG. 5 is a perspective view of a manual pulse generator.

Referring to the perspective view of FIG. 5, manual pulse generator 42 includes a rotary handle 421, and a casing 423 in which an electrical circuit is incorporated. Rotary handle 421 is rotated manually. Rotary handle 421 includes a projection 4210 at the front. Projection 4210 is provided to facilitate rotation of rotary handle 421 by the user. Casing 423 includes a terminal (not shown) to receive power supply, and a terminal (not shown) to transmit a signal that will be described afterwards to operation device 40.

Figure 6:
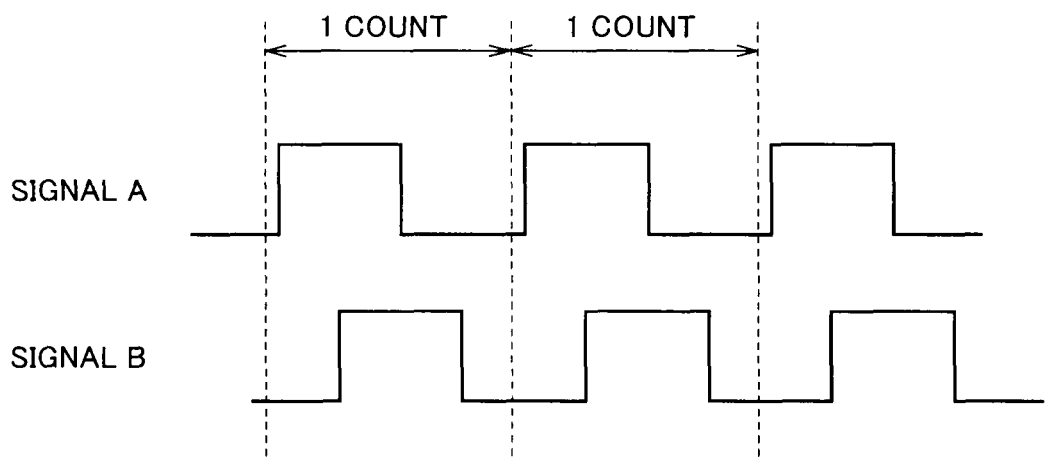
FIG. 6 represents signals generated by the manual pulse generator.

FIG. 6 represents signals generated by manual pulse generator 42. Manual pulse generator 42 generates two pulse signals based on the rotation of rotary handle 421, as shown in FIG. 6. Specifically, manual pulse generator 42 generates, when rotary handle 421 is rotated in the "+" direction (refer to FIG. 4), a pulse signal of layer A (signal A), and then a pulse signal of layer B (signal B) before signal A is rendered off. Manual pulse generator 42 generates, when rotary handle 421 is rotated in the "−" direction (refer to FIG. 4), a pulse signal of B layer, and then a pulse signal of layer A before signal B is rendered off.

At manual pulse generator 42, one pulse is generated at each of layer A and layer B when rotary handle 421 is turned by one scale.

Referring to FIG. 4 again, axis selector switch 43 allows the user to select the axis to be controlled. When the user selects "X", main unit 30 sets saddle 34 as the control object, and the X axis direction (the direction of arrow 301 in FIG. 2) as the control direction. When the user selects "Z", main unit 30 sets ram 35 as the control object. In this case, the control direction is the Z axis direction. When the user selects "Y", main unit 30 sets saddle 34 as the control object, and the Y axis direction (the direction of arrow 304 in FIG. 2) as the control direction.

For example, when "X" is selected, main unit 30 moves saddle 34 in the X axis direction based on the amount of rotation and direction of rotation of rotary handle 421 of manual pulse generator 42. Specifically, when "X" is selected, main unit 30 moves saddle 34 by just a distance based on the amount of rotation of rotary handle 421 in a direction based on the direction of rotation of rotary handle 421 (positive direction or negative direction in the X axis direction).

When "Y" is selected, main unit 30 moves saddle 34 in the Y axis direction based on the amount of rotation and direction of rotation of rotary handle 421 of manual pulse generator 42. Specifically, when "Y" is selected, main unit 30 moves saddle 34 by just a distance based on the amount of rotation of rotary handle 421 in a direction based on the direction of rotation of rotary handle 421 (positive direction or negative direction in the Y axis direction).

Further, when "Z" is selected, main unit 30 moves ram 35 in the Z axis direction based on the amount of rotation and direction of rotation of rotary handle 421 of manual pulse generator 42. Specifically, when "Z" is selected, main unit 30 moves ram 35 by just a distance based on the amount of rotation of rotary handle 421 in a direction based on the direction of rotation of rotary handle 421 (positive direction or negative direction in the Z axis direction).

Magnification selector switch 44 allows the travel of saddle 34, ram 35, and the like corresponding to the rotation of rotary handle 421 by, for example, one scale. Namely, magnification selector switch 44 functions to switch the amount of travel per one pulse. When "×10" is selected, main unit 30 moves saddle 34 and ram 35 by ten times the travel when "×1" is selected (hereinafter, "reference travel amount"). When "×100" is selected, main unit 30 moves saddle 34 and ram 35 by 100 times the reference travel amount. The reference travel amount in the X axis direction and the Y axis direction of saddle 34, and the reference travel amount of ram 35 in the Z axis direction are determined in advance.

As such, the user selects one of "X", "Y" and "Z", and turns rotary handle 421 of manual pulse generator 42, allowing saddle 34 and/or ram 35 to be moved by an amount and direction according to the rotation. In other words, when one of "X", "Y" and "Z" is selected, main unit 30 conducts position control according to the rotation of rotary handle 421.

When the user selects "C", main unit 30 sets table 36 as the control object. Main unit 30 rotates table 36 based on the amount and direction of rotation of rotary handle 421 of manual pulse generator 42. The direction of rotation and rotational speed of table 36 will be described afterwards.

Thus, when one of "X", "Y" and "Z" is selected by the selection of an axis through axis selector switch 43, machine tool 1 conducts position control of the spindle. When "C" is selected by the selection of an axis through axis selector switch 43, machine tool 1 conducts rotational speed control of table 36.

<Hardware Configuration>

FIG. 7 represents a hardware configuration of machine tool 1. Referring to FIG. 7, machine tool 1 includes operation panel 20, operation device 40, a control object group 500, a control object group 550, a servo motor group 600, a spindle motor group 650, a servo amplifier 700, a spindle amplifier 750, and a control device 800.

Operation device 40 receives power supply through operation panel 20. As described above, operation device 40 includes manual pulse generator 42, axis selector switch 43, and magnification selector switch 44. Manual pulse generator 42 includes rotary handle 421 and pulse signal generator 424.

Axis selector switch 43 includes an axis selection signal generator 431 generating a signal corresponding to the selected axis. Axis selection signal generator 431 constitutes a circuit corresponding to the selected axis to generate a signal corresponding to the selected axis. Namely, axis selection signal generator 431 forms a contact of the electrical circuit corresponding to the selected axis to generate a signal corresponding to the selected axis. Operation device 40 transmits the generated axis selection signal to control device 800 via operation panel 20.

Magnification selector switch 44 includes a magnification selection signal generator 441. Magnification selection signal generator 441 generates a signal corresponding to the selected magnification. Operation device 40 transmits the generated magnification selection signal to control device 800 via operation panel 20.

Control object group 500 includes a control object that travels linearly such as saddle 34 and ram 35. Control object group 550 includes a control object that performs rotational driving such as table 36.

Servo motor group 600 is formed of a plurality of servo motors 600-1 to 600-n. Each servo motor drives a corresponding control object. For example, servo motor 600-1 drives saddle 34. More specifically, saddle 34 is driven by a plurality of servo motors in practice since saddle 34 is capable of moving in the X axis direction and Y axis direction.

Spindle motor group 650 is formed of a plurality of spindle motors 650-1 to 650-m. Each spindle motor drives a corresponding control object. For example, spindle motor 650-1 rotatably drives table 36.

Servo amplifier 700 controls each servo motor in servo motor group 600 based on a command sent from control device 800. Spindle amplifier 750 drives each spindle motor included in spindle motor group 650 based on a command sent from control device 800.

Control device 800 is formed including a processor (not shown), and a memory (not shown) that can store a program, processing data and the like. Control device 800 performs numerical control (NC).

<Functional Block>

Figure 8:
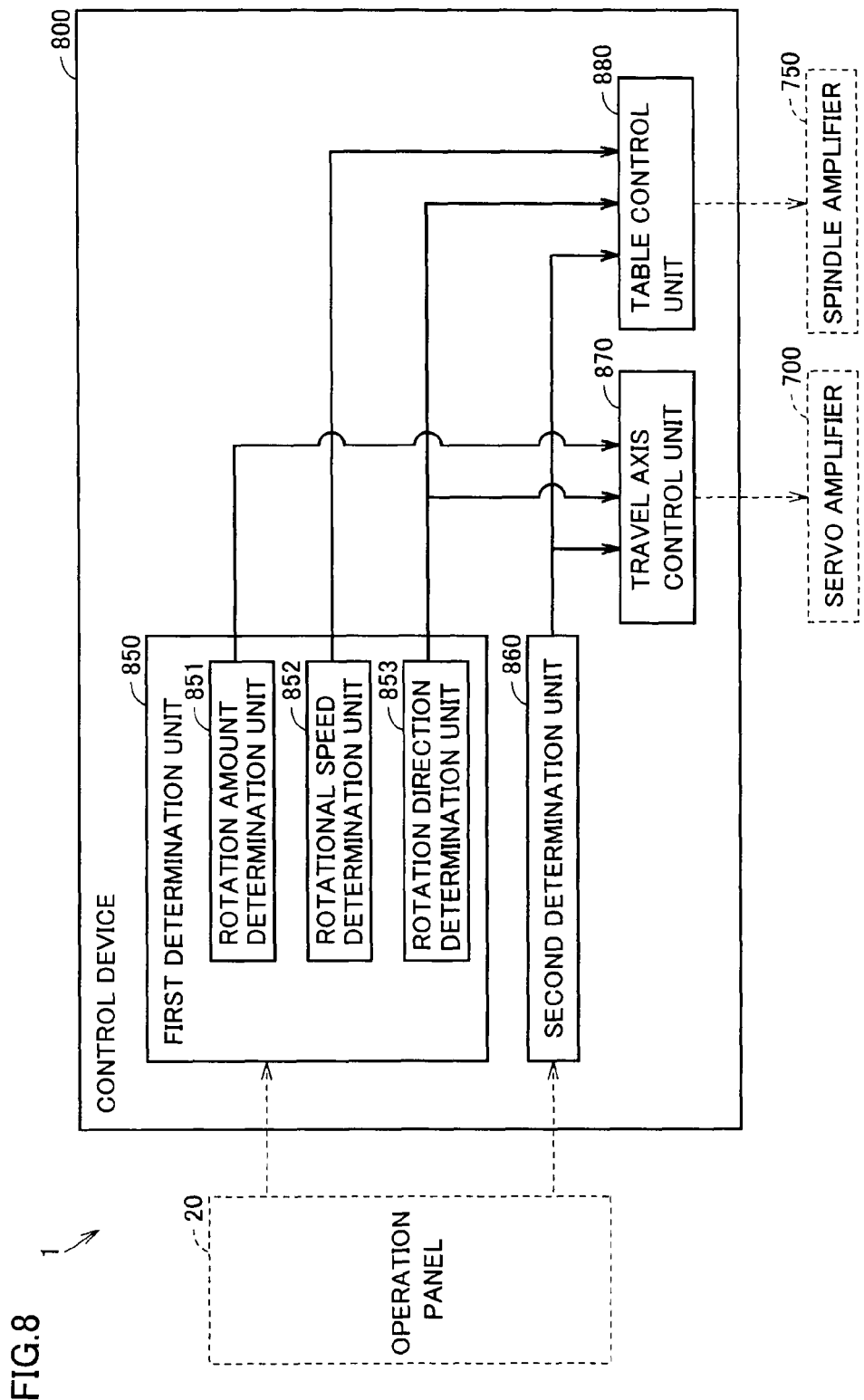
FIG. 8 is a functional block diagram of a numerical control device.

Referring to the functional block diagram of FIG. 8, control device 800 includes a first determination unit 850, a second determination unit 860, a travel axis control unit 870, and a table control unit 880. First determination unit 850 includes a rotation amount determination unit 851, a rotational speed determination unit 852, and a rotation direction determination unit 853.

Each of units 850, 860, 870 and 880 in control device 800 is a functional block. Specifically, each functional block is implemented by the processor executing a program stored in the memory. Each functional block can also be implemented by hardware.

First determination unit 850 determines the amount of rotation, rotational speed, and direction of rotation of rotary handle 421 based on the pulse generated by manual pulse generator 42. Specifically, the amount of rotation, rotational speed, and direction of rotation of rotary handle 421 are determined by rotation amount determination unit 851, rotational speed determination unit 852, and rotation direction determination unit 853, respectively.

Rotation amount determination unit 851 determines how many scales rotary handle 421 has been rotated based on the pulse generated by manual pulse generator 42. Rotation amount determination unit 851 transmits the determination result (amount of rotation) to travel axis control unit 870.

Rotational speed determination unit 852 determines the rotational speed based on the number of pulses of the pulse signal generated per unit time. Specifically, rotational speed determination unit 852 determines the rotational speed based on the count value (refer to FIG. 6) per unit time. The determination of the rotational speed is carried out continuously as long as rotary handle 421 is rotated. Rotational speed determination unit 852 transmits the determination result (rotational speed) continuously to table control unit 880.

Rotation direction determination unit 853 determines whether rotary handle 421 is rotated in the "+" direction or "−" direction based on the pulse generated at manual pulse generator 42. Rotation direction determination unit 853 transmits the determination result (rotation direction) to travel axis control unit 870 and table control unit 880.

Second determination unit 860 determines which of position control and rotational speed control has been selected by the axis selection through axis selector switch 43, based on the signal generated by axis selection signal generator 431. Specifically, second determination unit 860 determines which of "X", "Y", "Z" and "C" has been selected at operation device 40 based on the signal generated by axis selection signal generator 431. Second determination unit 860 transmits the determination result to travel axis control unit 870 and table control unit 880.

When a determination is made that position control is selected, control device 800 controls the amount and direction of travel of the spindle based on the amount of and direction of rotation of rotary handle 421. When a determination is made that rotational speed control is selected, control device 800 controls the rotational speed and direction of rotation of table 36 based on the rotational speed and direction of rotation of rotary handle 421. This will be described more specifically hereinafter.

Travel axis control unit 870 carries out the following process in response to the determination of the selection of one of "X", "Y" and "Z" by second determination unit 860. Specifically, travel axis control unit 870 calculates the direction of travel and amount of travel of the spindle based on the information indicating the selected axis (for example, "X"), information of the amount of rotation from rotation amount determination unit 851, information of the direction of rotation from rotation direction determination unit 853, and the signal from magnification selection signal generator 441. Travel axis control unit 870 sends a command based on the calculated result to servo amplifier 700. Accordingly, the spindle is moved by a distance based on the amount of rotation of rotary handle 421, and in a direction based on the direction of rotation of rotary handle 421.

Table control unit 880 carries out the following process when second determination unit 860 determines that C has been selected. Table control unit 880 calculates the direction of rotation and rotational speed of table 36 based on the information of the rotational speed from rotational speed determination unit 852 and information of the direction of rotation from rotation direction determination unit 853. Table control unit 880 sends a command based on the calculated result to spindle amplifier 750. Accordingly, table 36 is moved at a speed based on the rotational speed of rotary handle 421 in a direction based on the direction of rotation of rotary handle 421.

More specifically, table control unit 880 controls the rotational speed of table 36 in a stepped manner based on the rotational speed of rotary handle 421. Table control unit 880 conducts control such that the rotational speed of table 36 is increased as the rotational speed of rotary handle 421 becomes faster.

<Overview of Operation of Table 36>

Figures 9, 10:
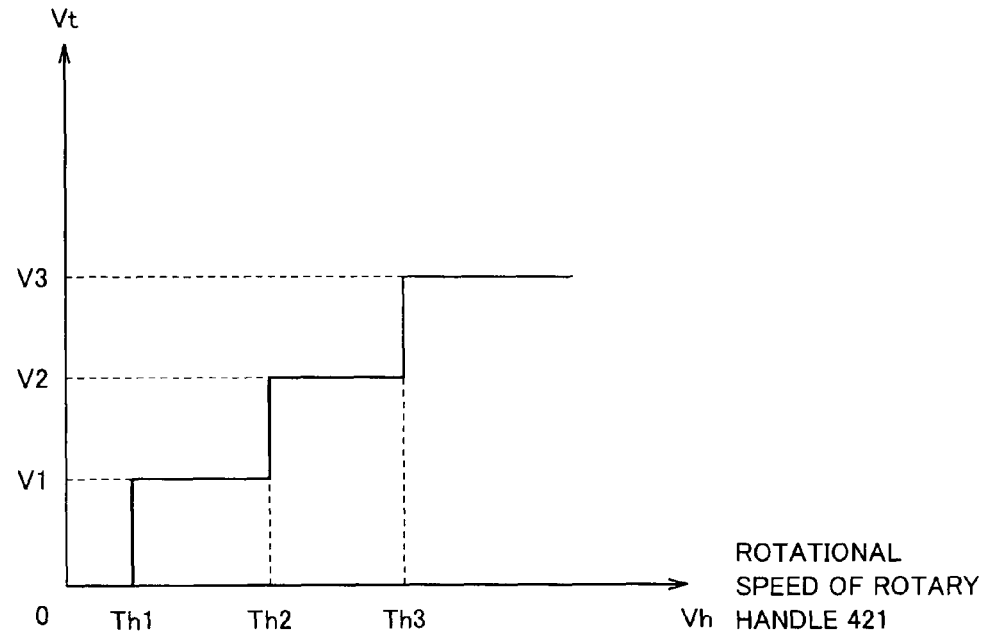
FIG. 9 represents the correspondence between the direction of rotation of a rotary handle and the direction of rotation of a table.
FIG. 10 is a graph representing the relationship between a rotational speed Vh of the rotary handle and a rotational speed Vt of the table.

FIG. 9 represents the correspondence between the direction of rotation of rotary handle 421 and the direction of rotation of table 36. As shown in FIG. 9, when the direction of rotation of rotary handle 421 is in the "+" direction (refer to FIG. 4), machine tool 1 causes table 36 to rotate clockwise (the direction of arrow 305 in FIG. 2). When the direction of rotation of rotary handle 421 is in the "−" direction, machine tool 1 causes table 36 to rotate counterclockwise (the direction of arrow 306 in FIG. 2).

The corresponding relationship between the direction of rotation of rotary handle 421 and the direction of rotation of table 36 is not limited to that set forth above. For example, machine tool 1 may be configured to cause table 36 to rotate counterclockwise and clockwise when the direction of rotation of rotary handle 421 is in the "+" direction and "−" direction, respectively.

FIG. 10 is a graph representing the relationship between a rotational speed Vh of rotary handle 421 and a rotational speed Vt of table 36. Referring to FIG. 10, machine tool 1 sets rotational speed Vt of table 36 at a speed V3 when rotational speed Vh of rotary handle 421 at operation device 40 is greater than or equal to a threshold Th3. When rotational speed Vh of rotary handle 421 is at least threshold Th2 and less than threshold Th3, machine tool 1 sets rotational speed Vt of table 36 at a speed V2. When rotational speed Vh of rotary handle 421 is at least threshold Th1 and less than threshold Th2, machine tool 1 sets rotational speed Vt of table 36 at a speed V1. In the case where rotational speed Vh of rotary handle 421 is less than threshold Th1, machine tool 1 does not rotate table 36. Machine tool 1 adjusts rotational speed Vt of table 36 according to relevant rotational speed Vh every time rotational speed determination unit 852 determines rotational speed Vh of rotary handle 421.

The data indicating the relationship between the rotational speed (Vh) of rotary handle 421 and the rotational speed (Vt) of table 36 shown in FIG. 10 is prestored in the memory. The data shown in FIG. 10 can be modified based on an input operation by the user. For example, machine tool 1 may be configured to allow modification of the values of speed V1, V2 and V3. Further, machine tool 1 may be configured to allow modification of the values of threshold Th1, Th2, and Th3. Moreover, the number of steps of the speed is not limited to three (V1, V2, V3), and may be set to four or more steps, or less than 3 steps. Machine tool 1 may be configured to allow modification of the number of steps of the speed. In addition, machine tool 1 may be configured to set rotational speed Vt of table 36 immediately at V1 in response to any change of rotational speed Vh of rotary handle 421 from "0".

<Control Configuration>

Figure 11:
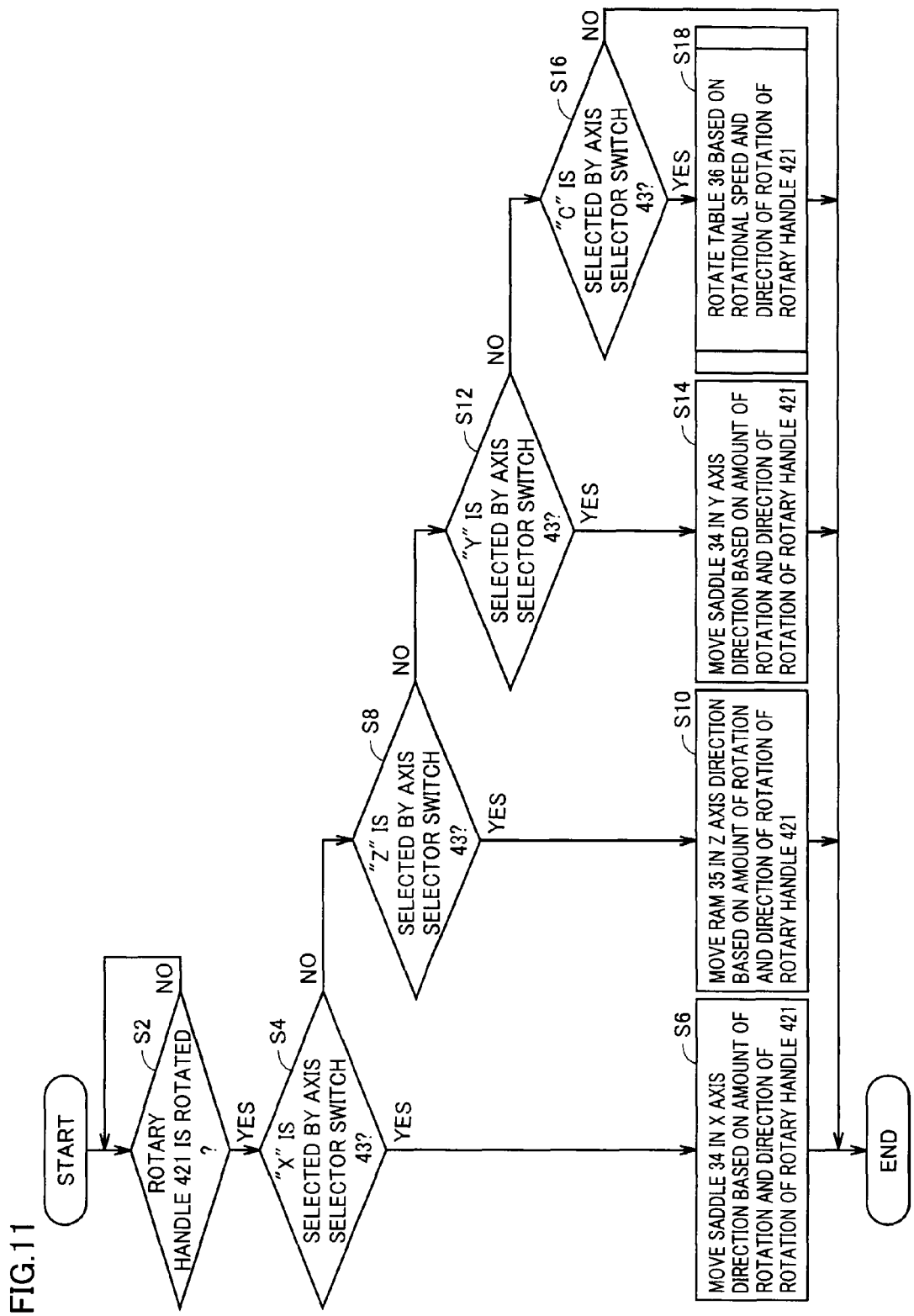
FIG. 11 is a flowchart of the flow of processes at a machine tool.

FIG. 11 is a flowchart of the process carried out at machine tool 1. At step S2, machine tool 1 determines whether rotary handle 421 at operation device 40 is rotated or not. When machine tool 1 determines that rotary handle 421 is rotated (YES at step S2), control proceeds to step S4 to determine whether X is selected by axis selector switch 43 or not. When machine tool 1 determines that rotary handle 421 is not rotated, control returns to step S2.

When machine tool 1 determines that X is selected (YES at step S4), control proceeds to step S6. Saddle 34 is moved in the X axis direction (the direction of arrow 301 in FIG. 2), based on the amount and direction of rotation of rotary handle 421. When machine tool 1 determines that X is not selected (NO at step S4), control proceeds to step S8 where a determination is made whether Z is selected by axis selector switch 43 or not.

When machine tool 1 determines that Z is selected (YES at step S8), control proceeds to step S10. Ram 35 is moved in the Z axis direction (the direction of arrow 303 in FIG. 2) based on the amount and direction of rotation of rotary handle 421. When machine tool 1 determines that Z is not selected (NO at step S8), control proceeds to S12 where a determination is made whether Y is selected by axis selector switch 43 or not.

When machine tool 1 determines that Y is selected (YES at step S12), control proceeds to step S14. Saddle 34 is moved in the Y axis direction (the direction of arrow 304 in FIG. 2) based on the amount and direction of rotation of rotary handle 421. When machine tool 1 determines that Y is not selected (NO at step S12), control proceeds to step S16 where a determination is made whether C is selected by axis selector switch 43 or not.

When machine tool 1 determines that C is selected (YES at step S16), control proceeds to step S18. Table 36 is rotated based on the rotational speed and direction of rotation of rotary handle 421. When machine tool 1 determines that C is not selected (NO at step S16), the process ends.

Figure 12:
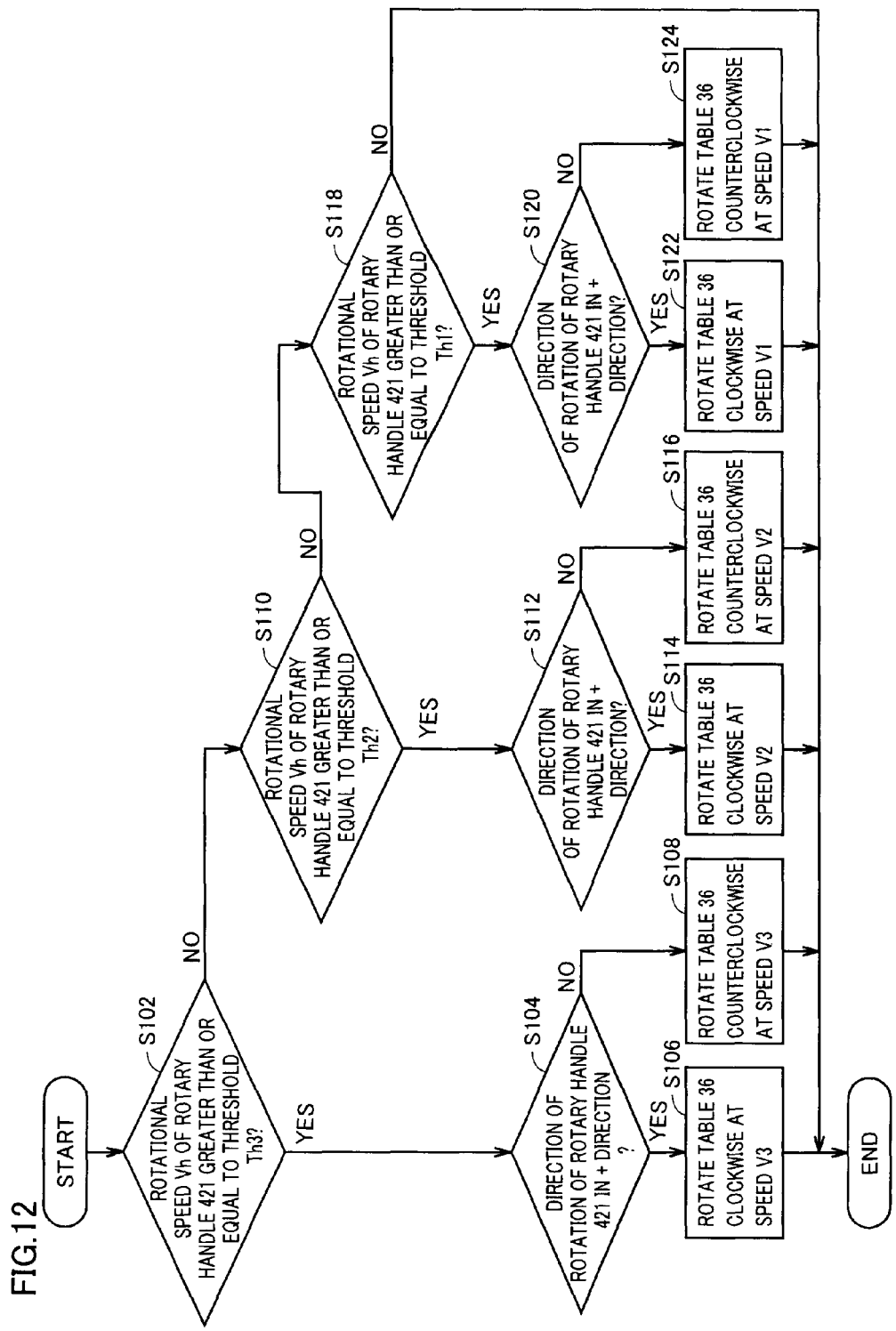
FIG. 12 is a flowchart representing the details of the process of step S18 shown in FIG. 11.

FIG. 12 is a flowchart representing the details of step S18 of FIG. 11. At step S102, machine tool 1 determines whether rotational speed Vh of rotary handle 421 is greater than or equal to threshold Th3. When machine tool 1 determines that rotational speed Vh is greater than or equal to threshold Th3 (YES at step S102), control proceeds to step S104 to determine whether the direction of rotation of rotary handle 421 is in the "+" direction.

When machine tool 1 determines that the direction of rotation is "+" (YES at step S104), control proceeds to step S106. Table 36 is rotated clockwise at speed V3. When machine tool 1 determines that the direction of rotation is not "+" (NO at step S104), control proceeds to step S108. Table 36 is rotated counterclockwise at speed V3.

When machine tool 1 determines that rotational speed Vh is not greater than or equal to threshold Th3 (NO at step S102), control proceeds to step S110 to determine whether rotational speed Vh of rotary handle 421 is greater than or equal to threshold value Th2. When machine tool 1 determines that rotational speed Vh is greater than or equal to threshold value Th2 (YES at step S110), control proceeds to step S112 to determine whether the direction of rotation of rotary handle 421 is in the "+" direction or not.

When machine tool 1 determines that the direction of rotation is "+" (YES at step S112), control proceeds to step S114. Table 36 is rotated clockwise at speed V2. When machine tool 1 determines that the direction of rotation is not "+" (NO at step S112), control proceeds to step S116. Table 36 is rotated counterclockwise at speed V2.

When machine tool 1 determines that rotational speed Vh is not greater than or equal to threshold value Th2 (NO at step S110), control proceeds to step S118 to determine whether rotational speed Vh of rotary handle 421 is greater than or equal to threshold value Th1. When machine tool 1 determines that rotational speed Vh is greater than or equal to threshold value Th1 (YES at step S118), control proceeds to step S120 to determine whether the direction of rotation of rotary handle 421 is "+" or not.

When machine tool 1 determines that the direction of rotation is "+" (YES at step S120), control proceeds to step S122. Table 36 is rotated clockwise at speed V1. When machine tool 1 determines that the rotation direction is not "+" (NO at step S120), control proceeds to step S124. Table 36 is rotated counterclockwise at speed V1.

<Outline of Machine Tool 1>

(1) Thus, machine tool 1 carries out position control of a spindle that moves along a first axis (X, Y or Z axis), and rotational speed control of table 36 that rotates about a second axis (central axis 361). Machine tool 1 includes a manual pulse generator 42, an axis selector switch 43 for selecting manually one of a plurality of axes including the first axis and the second axis, and a control device 800.

Manual pulse generator 42 includes a rotary handle 421 rotated by hand, and a pulse signal generator 424 generating a pulse signal based on rotation of rotary handle 421, and transmitting the generated pulse signal to control device 800. Axis selector switch 43 includes an axis selection signal generator 431 generating a signal corresponding to the selected axis, and transmitting the generated signal to control device 800.

Control device 800 includes a first determination unit 850 determining the amount, speed, and direction of rotation of rotary handle 421 based the pulse signal, and a second determination unit 860 determining which of position control and rotational speed control has been selected by selection of an axis by axis selector switch 43 based on the signal generated by axis selection signal generator 431.

Control device 800 controls the amount and direction of travel of the spindle based on the amount of rotation and direction of rotation of rotary handle 421 when a determination is made that position control is selected. Further, control device 800 controls the rotational speed and direction of rotation of table 36 based on the rotational speed and direction of rotation of rotary handle 421 when a determination is made that rotational speed control is selected.

Therefore, when rotational speed control is selected by axis selector switch 43, machine tool 1 rotates table 36 based on the direction of rotation and rotational speed of rotary handle 421 at manual pulse generator 42.

Accordingly, the user rotates rotary handle 421 at manual pulse generator 42, after selecting rotational speed control through axis selector switch 43, allowing the work on table 36 to be rotated in a direction and speed based on the direction of rotation and rotational speed of rotary handle 421. As such, the user can readily set the direction of rotation and rotational speed of the rotating body by means of the manual pulse generator. Further, the user can cause the rotating body to move at the set direction of rotation and rotational speed. By such rotation, centering of the work is facilitated.

Machine tool 1 can realize rotation of table 36 even if it lacks a function to perform position control of table 36. Moreover, machine tool 1 does not necessarily have to include a rotational speed selector switch, a normal rotation button, and a reverse rotation button.

(2) Control device 800 controls the rotational speed of table 36 in a stepped manner based on the rotational speed of rotary handle 421. The rotational speed of table 36 is increased as the rotational speed of rotary handle 421 becomes faster.

Therefore, the user can increase the rotational speed of table 36 by increasing the rotational speed of rotary handle 421. Table 36 can be rotated at a constant speed as long as the user rotates rotary handle 421 at a rotational speed within a certain range (for example, threshold Th1 to Th2).

<Supplemental>

(1) The above description is based on position control of the spindle and rotational speed control of table 36 at an operation device 40 that is a handy movable instrument. Machine tool 1 can execute such position control and rotational speed control through the usage of manual pulse generator 222, axis selector switch 223, and magnification switches 224, 225 and 226 provided at operation panel 20 (refer to FIG. 3).

Magnification switches 224, 225 and 226 are implemented as push buttons. Further, the selection of magnification through magnification selector switch 44 at operation device 40 (refer to FIG. 4) is conducted by selection of magnification switches 224, 225 and 226 on operation panel 20.

(2) The present embodiment has been described based on control of the spindle and table 36 at machine tool 1 that is a vertical lathe. However, the control object is not limited to the spindle and table 36. The present invention is applicable as long as the control object is a movable body that moves along an axis, and a rotating body that rotates about an axis differing from said axis. For example, the movable body may be saddle 34, and the rotating body may be the spindle, instead of table 36.

(3) Machine tool 1 is not limited to a vertical lathe, and may be any lathe that has a movable body that moves along a certain axis, and a rotating body rotating about an axis differing from said axis. Moreover, machine tool 1 is not limited to a lathe, and may be a machining center that has a movable body moving along an axis, and a rotating body rotating about an axis differing from said axis.

(4) Machine tool 1 may be configured to modify rotational speed Vt of table 36 relative to rotational speed Vh of rotary handle 421 by selecting a magnification through magnification selector switch 44. Namely, the values of speed V1, V2 and V3 may be modified by magnification "×1", "×10" and "×100", respectively. The magnification for modification is not limited to 10 times and 100 times.

(5) Although the above description corresponds to an example in which rotational speed Vt of table 36 is based on 3 steps (refer to FIG. 10), rotational speed Vt of table 36 is not restricted to 3 steps. Rotational speed Vt of table 36 may be in 2 steps, or more than 3 steps. Alternatively, machine tool 1 may be configured such that rotational speed Vh of rotary handle 421 and rotational speed Vt of table 36 have a linear relationship.

(6) The present invention is not limited to a machine tool, and is applicable to general industrial equipment performing position control of a movable body moving along an axis, and rotational speed control of a rotating body rotating about an axis differing from said axis.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An industrial instrument performing position control of a movable body moving along a first axis, and rotational speed control of a rotating body rotating about a second axis, comprising:

a manual pulse generator, a selector switch for selecting manually one of a plurality of axes including said first axis and said second axis, and a control device, said manual pulse generator including a rotary handle configured to be rotated by hand, and a first signal generator configured to generate a pulse signal based on rotation of said rotary handle, and transmit the generated pulse signal to said control device, said selector switch including a second signal generator configured to generate a signal corresponding to the selected axis, said second signal generator transmitting a signal corresponding to the selected axis to said control device, said control device including a first determination unit configured to determine an amount of rotation, rotational speed, and direction of rotation of said rotary handle, based on said pulse signal, and a second determination unit configured to determine which of said position control and said rotational speed control is selected by selection of an axis through said selector switch, based on the signal generated by said second signal generator, said control device controlling when a determination is made that said position control is selected, an amount and direction of travel of said movable body based on the amount of rotation and direction of rotation of said rotary handle, and when a determination is made that said rotational speed control is selected, the rotational speed and direction of rotation of said rotating body based on the rotational speed and direction of rotation of said rotary handle.

2. The industrial instrument according to claim 1, wherein said control device controls the rotational speed of said rotating body in a stepped manner based on the rotational speed of said rotary handle, and increases the rotational speed of said rotating body as the rotational speed of said rotary handle becomes faster.

3. A machine tool including a movable body moving along a first axis, and a rotating body rotating about a second axis, performing position control of said movable body and rotational speed control of said rotating body, said machine tool comprising:

a manual pulse generator, a selector switch for selecting manually one of a plurality of axes including said first axis and said second axis, and a control device, said manual pulse generator including a rotary handle configured to be rotated by hand, and a first signal generator configured to generate a pulse signal based on rotation of said rotary handle, and transmit the generated pulse signal to said control device, said selector switch including a second signal generator configured to generate a signal corresponding to the selected axis, said second signal generator transmitting a signal corresponding to the selected axis to said control device, said control device including a first determination unit configured to determine an amount of rotation, rotational speed, and direction of rotation of said rotary handle, based on said pulse signal, and a second determination unit configured to determine which of said position control and said rotational speed control is selected by selection of an axis through said selector switch, based on the signal generated by said second signal generator, said control device controlling when a determination is made that said position control is selected, an amount and direction of travel of said movable body based on the amount of rotation and direction of rotation of said rotary handle, and when a determination is made that said rotational speed control is selected, the rotational speed and direction of rotation of said rotating body based on the rotational speed and direction of rotation of said rotary handle.

* * * * *